(12) United States Patent
Kobayashi et al.

(10) Patent No.: US 10,518,734 B2
(45) Date of Patent: Dec. 31, 2019

(54) SIDE AIRBAG DEVICE

(71) Applicant: AUTOLIV DEVELOPMENT AB, Vargarda (SE)

(72) Inventors: Yuto Kobayashi, Yokohama (JP); Mitsuo Nogami, Yokohama (JP)

(73) Assignee: AUTOLIV DEVELOPMENT AB, Vargada (SE)

( * ) Notice: Subject to any disclaimer, the term of this patent is extended or adjusted under 35 U.S.C. 154(b) by 142 days.

(21) Appl. No.: 15/768,588

(22) PCT Filed: Oct. 3, 2016

(86) PCT No.: PCT/JP2016/079217
§ 371 (c)(1),
(2) Date: Apr. 16, 2018

(87) PCT Pub. No.: WO2017/068941
PCT Pub. Date: Apr. 27, 2017

(65) Prior Publication Data
US 2018/0304845 A1    Oct. 25, 2018

(30) Foreign Application Priority Data
Oct. 23, 2015  (JP) ................. 2015-209057

(51) Int. Cl.
*B60R 21/207* (2006.01)
*B60N 2/75* (2018.01)
*B60R 21/231* (2011.01)

(52) U.S. Cl.
CPC .............. *B60R 21/207* (2013.01); *B60N 2/75* (2018.02); *B60R 21/23138* (2013.01); *B60R 2021/23146* (2013.01)

(58) Field of Classification Search
CPC ............ B60R 21/207; B60R 21/23138; B60R 2021/23146; B60N 2/75
See application file for complete search history.

(56) References Cited

U.S. PATENT DOCUMENTS 8,924,086 B2    12/2014  Thomas
2010/0295277 A1*  11/2010  Ochiai .............. B60R 21/23138
                                                280/729

(Continued)

FOREIGN PATENT DOCUMENTS

CN          103241206 A1    8/2013
DE    10 2013 201 395 A1    8/2013
(Continued)

OTHER PUBLICATIONS

International Search Report of PCT/JP2016/079217 dated Nov. 8, 2016.

*Primary Examiner* — Drew J Brown
(74) *Attorney, Agent, or Firm* — Brinks Gilson & Lione

(57) ABSTRACT

A side airbag device including a cushion (104), an inflator (110), and a structure such as a rotating shaft (140) built in a seat (102). The inflator (110) has a gas ejection hole inside the cushion (104), a connector (136) on the other end side, and a stud bolt (112). The cushion (104) has a bag-shaped chamber (114), an extension portion (124) into which the inflator (110) is inserted, and a predetermined tab (118) held in the vicinity of the other end side of the inflator (110). The rotating shaft (140) is disposed to pass through a space portion (E1) surrounded by the chamber (114), the extension portion (124), the inflator (110), and the tab (118), and the cushion (104) is attached to the seat (102) by the stud bolt (112).

10 Claims, 7 Drawing Sheets

(56) References Cited

U.S. PATENT DOCUMENTS

| | | | |
|---|---|---|---|
| 2012/0038135 A1* | 2/2012 | Oomori | B60R 21/23138 280/730.2 |
| 2012/0217730 A1* | 8/2012 | Baba | B60R 21/23138 280/729 |
| 2012/0217731 A1* | 8/2012 | Baba | B60R 21/233 280/730.2 |
| 2013/0197764 A1 | 8/2013 | Thomas | |
| 2017/0072893 A1* | 3/2017 | Fujiwara | B60R 21/23138 |

FOREIGN PATENT DOCUMENTS

| | | |
|---|---|---|
| JP | 2009-166786 A | 7/2009 |
| JP | 2010-221759 A | 10/2010 |

\* cited by examiner (a)

(b)

(a)

(b)

CROSS SECTION A-A

SIDE AIRBAG DEVICE

CROSS-REFERENCE TO RELATED APPLICATIONS

This application is a 35 U.S.C. § 371 national phase application of PCT International Application No. PCT/JP2016/079217, filed Oct. 3, 2016, which claims the benefit of priority under 35 U.S.C. § 119 to Japanese Patent Application No. 2015-209057, filed Oct. 23, 2015, the contents of which are incorporated herein by reference in their entirety.

FIELD OF THE INVENTION

The present invention relates to a side airbag device including an airbag cushion which inflates and deploys using gas toward a side of an occupant sitting in a seat of a vehicle and a vehicle front side.

BACKGROUND

Airbag devices have become almost standard equipment in recent vehicles.

An airbag device is a safety device that operates during an emergency such as a vehicle collision, and inflates and deploys an airbag cushion (hereinafter simply referred to as "cushion") with a gas pressure to receive and protect an occupant. Airbag devices come in various types in accordance with installation locations or applications. For example, in order to protect a driver from impact in the longitudinal (frontal impact) direction, a front airbag device is provided at the center of a steering wheel. In addition, in order to protect the occupant from impacts in the vehicle width direction (side impact) which are caused by a side collision or the like, a curtain airbag device is provided in the vicinity of a roof above a side window, and a side airbag device is provided in a side portion of a seat.

Various airbag devices are provided with a gas generating device called an inflator as a gas supply source. Various types of inflators also can be used depending on the type of the airbag and installation location thereof. For example, a disk-type (disk-like, or pancake) inflator is mainly used for a front airbag device, and a cylinder-type (cylinder-like) inflator is mainly used for a curtain airbag device and a side airbag device (see, for example, Japanese Patent Application Publication No. 2009-1057).

SUMMARY

As shown in FIG. 1 of the above-cited reference, the airbag cushion and the inflator of the side airbag device are built in the side portion of the seatback of a seat. Since the available space inside the seatback is limited, the inflator is often installed with the longitudinal direction thereof along the vertical direction of the seatback. As a result, the layout of the inflator with respect to the airbag cushion is also restricted, and many inflators are configured to be inserted into the lower end or upper end of the airbag cushion on the vehicle rear side.

In some cases, other structures may be additionally present in the seatback of the above-described seat. For example, in a seat having an armrest, the rotation (pivot) shaft of the armrest is built in the side portion of the seatback. When such a structure exists, the layout of the inflator is further restricted.

The present invention has been created in view of the above problems, and it is an object of the present invention to provide a side airbag device in which the degree of freedom of the layout of the inflator can be ensured even when other structures are present inside a seat, and the airbag cushion can be inflated and deployed more rapidly.

In order to solve the abovementioned problem, a typical configuration of a side airbag device according to the present invention includes: an airbag cushion which is built in a seat of a vehicle and inflates and deploys using gas toward a side of an occupant sitting in the seat and a vehicle front side. The configuration further includes an inflator having a cylindrical shape and having one end side inserted into the airbag cushion to supply gas to the airbag cushion; and a predetermined structure which is built in the seat, extends in a vehicle width direction and is fixed to the seat. The inflator has: a gas ejection hole which is disposed inside the airbag cushion to eject gas; a connector which is provided on the other end side and to which a predetermined harness is connected; and a stud bolt which is provided at a predetermined location and is fastened to the seat. The airbag cushion has: a chamber formed in a bag shape; an extension portion which extends from the chamber on a vehicle rear side and into which the one end side of the inflator is inserted; and a predetermined tab which extends from the chamber in the vicinity of the extension portion and is held in the vicinity of the other end side of the inflator. The predetermined structure is disposed so as to pass through a space portion surrounded by the chamber, the extension portion, the inflator, and the tab, and the airbag cushion is attached to the seat by the stud bolt.

The predetermined structure built in the seat can be exemplified by a rotation shaft of the below-described armrest. When such a structure is present inside the seat, the installation space of the airbag cushion and the inflator is limited, so that the degree of freedom of the layout of the inflator is particularly restricted. However, with the above-described configuration, since the structure can be efficiently avoided, the degree of freedom of the layout of the inflator can be increased.

With the above-described configuration, the airbag cushion can be supported by using not only the stud bolt of the inflator but also the predetermined structure built in the seat. For example, when the inflator is in operation, the behavior of the airbag cushion can be regulated and stabilized with the predetermined structure, so that the airbag cushion can be inflated and deployed more rapidly toward the target range.

In the above-described configuration, one end side of the inflator is inserted into and attached to the extension portion. The diameter of the extension portion may be large enough to insert the inflator, and there is no need to provide an opening portion having a size larger than that in the airbag cushion. Therefore, with the above-described configuration, it is possible to suppress the outflow amount of the gas from the cushion during the operation of the inflator, and to improve the internal pressure holding performance of the airbag cushion.

The airbag cushion may further include a non-inflatable portion that is a joining portion of the base cloth of the chamber, and the tab may extend from the non-inflatable portion. With this configuration, the tab can be advantageously implemented.

The tab may be formed of a base cloth independent of the base cloth of the chamber and attached to the chamber. With this configuration, the tab can also be advantageously implemented.

The tab may have a loop that is hooked in the vicinity of the other end side of the inflator. With this configuration, the tab is advantageously held in the inflator.

The tab may have a through hole to be hooked in the vicinity of the other end side of the inflator. Also with this configuration, the tab is suitably held in the inflator.

The tab may have a bolt hole through which the stud bolt passes. With this configuration as well, the inflator can be advantageously held.

The extension may be formed of a base cloth independent of the base cloth of the chamber and attached to the chamber by sewing. With this configuration, the extension can be advantageously implemented.

The side airbag device may further include a predetermined band for fastening the extension portion to the inflator. By fastening the extension part with the band, it is possible to prevent the outflow of the gas and efficiently hold the internal pressure of the airbag cushion.

The predetermined structure may be the rotation shaft of the armrest of the seat. With the above configuration, it is possible to efficiently install the airbag cushion and the inflator at the seat having the armrest, and additionally, it is possible to support the airbag cushion by using the rotation shaft of the armrest.

The above-described airbag cushion may be inflated and deployed on the occupant side (vehicle inner side) in the vehicle width direction with respect to the armrest. Because of the presence of the armrest on the outer side (vehicle outer side), in the vehicle width direction, of the airbag cushion, the load of the occupant in contact with the airbag cushion from the vehicle inner side can be absorbed by the armrest thereby increasing the occupant restraining force of the airbag cushion.

According to the present invention, there is provided a side airbag device in which the degree of freedom of the layout of the inflator can be ensured even when other structures are present inside a seat, and the airbag cushion can be inflated and deployed more rapidly.

DETAILED DESCRIPTION

Figure 1:
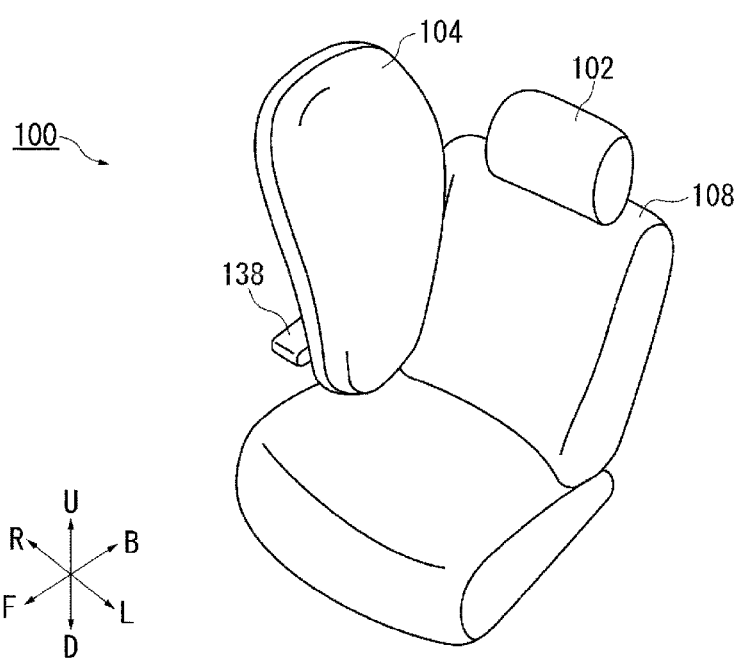
FIGS. 1(a) and 1(b) are views illustrating a side airbag device according to an embodiment of the present invention.
Figure 1:
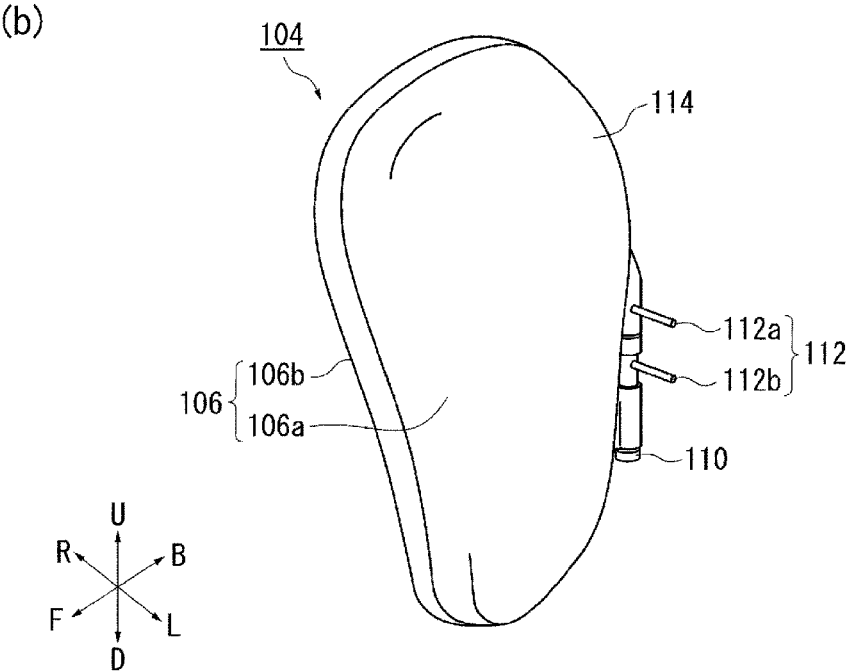

Preferred embodiments of the present invention will now be described in detail with reference to the accompanying drawings. The dimensions, materials, and also concrete numerical values and the like shown in such embodiments are merely exemplary and serve to facilitate understanding of the invention, and the present invention is not limited thereto unless otherwise noted. In the specification and the drawings, elements having substantially the same function and configuration are denoted by the same reference numerals, and redundant explanation thereof is omitted.

Elements not directly related to the present invention are not shown in the drawings.

FIGS. 1(a) and 1(b) are diagrams illustrating a side airbag device 100 according to an embodiment of the present invention. In FIG. 1(a), the side airbag device 100 and a seat 102 on the vehicle right side at which the side airbag device 100 is used are illustrated from the inside in the vehicle width direction (inside the vehicle). In FIG. 1(a) and all other drawings of the present application, the forward and backward directions of the vehicle are indicated by arrows F (Forward) and B (Back), the left and right in the vehicle width direction are indicated by arrows L (Left) and R (Right) are indicated by arrows U (up) and D (down), respectively.

As shown in FIG. 1(a), the side airbag device 100 is configured such that the airbag cushion 104 is inflated and deployed from the inside of a seatback 108 of the seat 102. The cushion 104 is a portion for restraining the occupant in the event of an emergency. In the present embodiment, the cushion 104 is inflated and deployed from the side portion on the outer side (vehicle outer side) of the seatback 108 in the vehicle width direction to the side of the occupant (not shown) at the seat and toward the vehicle front side.

Before the operation of the side airbag device 100, the cushion 104 is wound (rolled) or folded and stored in a predetermined storage section built in the seatback 108. Since the surface material of the seatback 108 covers the cushion 104 from above in the stored state, the cushion cannot normally be seen from the outside. When the side airbag device 100 is in operation, the cushion 104 ruptures the surface material of the seatback 108 and is inflated and deployed, thereby restraining the occupant.

FIG. 1(b) is a view showing only the cushion 104 of FIG. 1(a). The cushion 104 has a flat shape as a whole. The outer surface of the cushion 104 is constituted by main panels 106 (main panels 106a, 106b). The main panel 106 is made of a base cloth and is formed into a bag shape as a whole by sewing, adhesive bonding, or the like. The cushion 104 can also be formed by spinning or the like by using OPW (One-Piece Woven).

An inflator 110 is attached to the cushion 104. The inflator 110 is a gas generating device which operates upon receiving an operation signal transmitted from the vehicle when an impact occurs, and supplies gas to the interior of the cushion 104. The inflator 110 is provided with stud bolts 112 (stud bolts 112a, 112b). The stud bolts 112 are fastened inside the seatback 108 (see FIG. 1(a)). The cushion 104 is also attached to the seatback 108 through fastening of the stud bolts 112 to the seatback 108.

Figure 2:
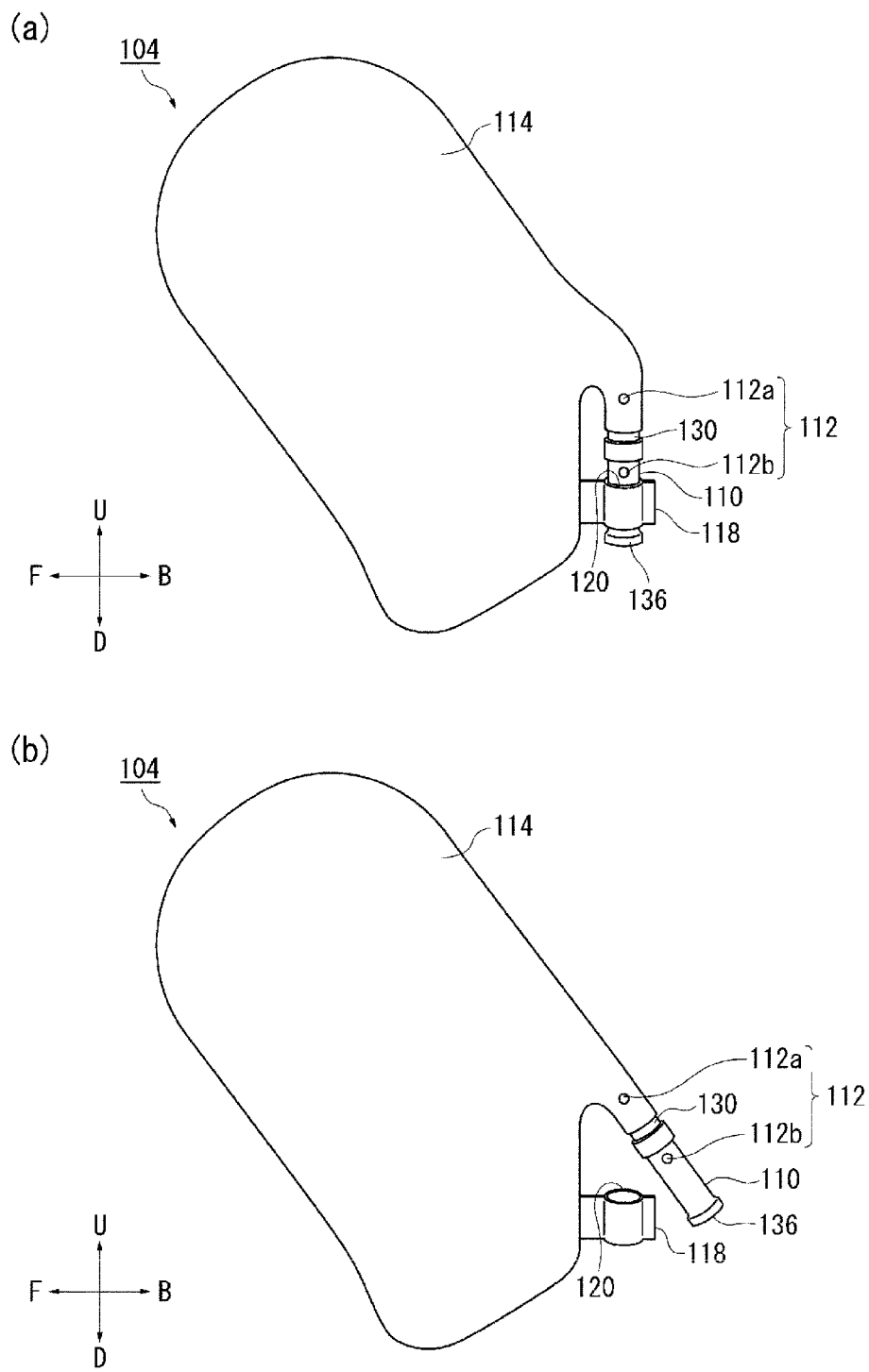
FIGS. 2(a) and 2(b) are views illustrating the cushion shown in FIG. 1(b) from another direction.

FIGS. 2(a) and 2(b) are diagrams illustrating, from another direction, the cushion 104 shown in FIG. 1(b). FIG. 2(a) illustrates the cushion 104 as seen from the vehicle inner side. A chamber 114 is the region of the cushion 104 that restrains the occupant, and this chamber is formed in a bag shape by joining the base cloth.

An inflator attachment portion 116 is a portion to which the inflator 110 is attached. The inflator attachment portion 116 protrudes from the chamber 114 on the vehicle rear side, and the inflator 110 is inserted from one end side thereof in the longitudinal direction into the inflator attachment portion and attached.

A tab 118 is a portion that is held in the vicinity of the other end side, in the longitudinal direction, of the inflator 110 exposed from the inflator attachment portion 116. Since the inflator 110 is fixed to the seatback 108, by connecting the inflator 110 and the chamber 114 with the tab 118, it is possible to suppress the vibration of the chamber 114 during the operation of the inflator 110.

FIG. 2(b) illustrates a state in which the inflator 110 shown FIG. 2(a) is removed from the tab 118. In this embodiment, the tab 118 extends from the chamber 114 to form a loop 120. The loop 120 has a simple structure and can be caught on the inflator 110, with the inflator 110 being passed therethrough, and held advantageously on the inflator 110.

Figure 3:
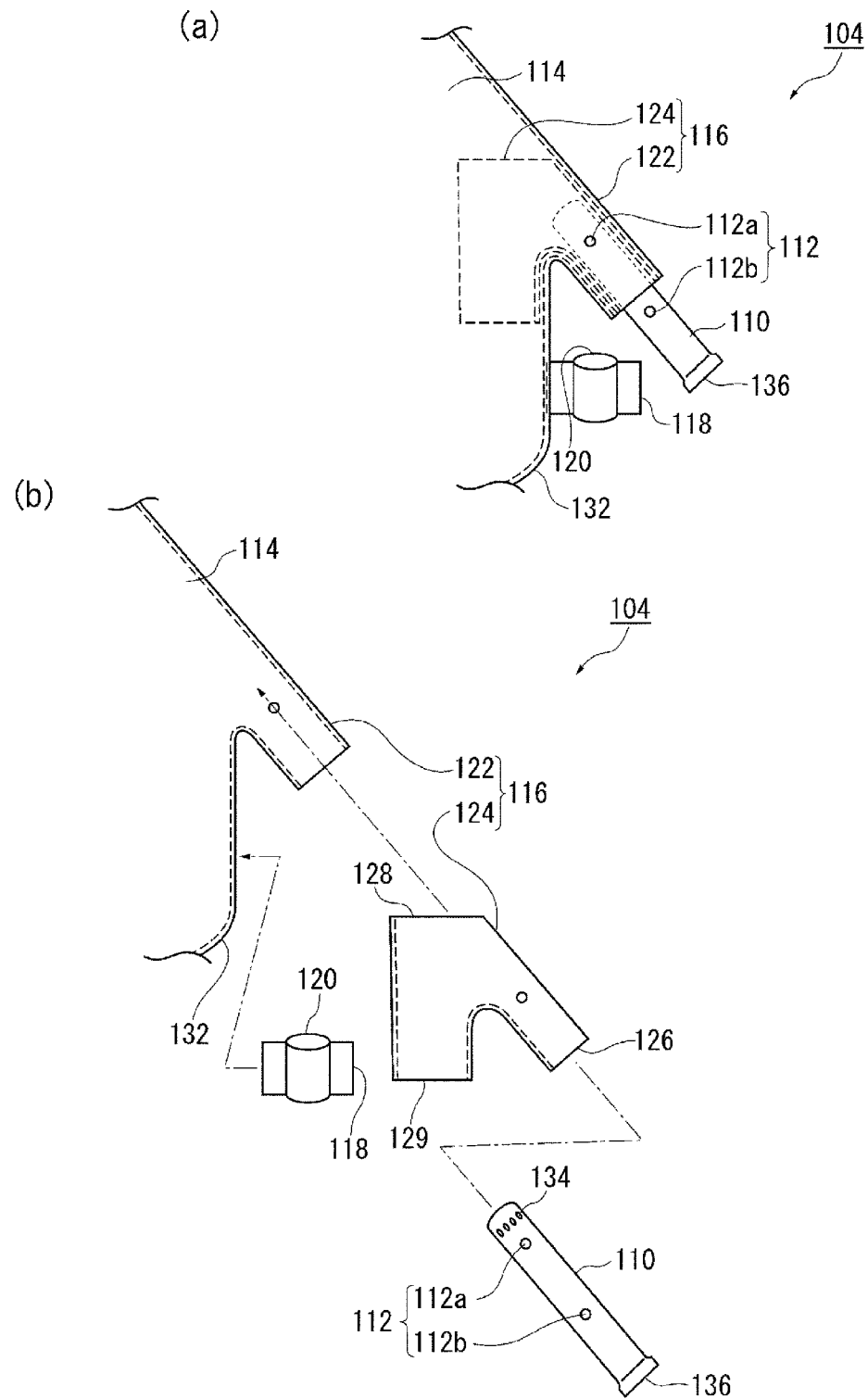
FIGS. 3(a) and (3b) are views showing the vicinity of the inflator attachment portion shown in FIG. 2(b).

FIGS. 3(a) and 3(b) illustrate the vicinity of the inflator attachment portion 116 shown in FIG. 2(b). In FIG. 3(a), the vicinity of the inflator attachment portion 116 is enlarged. One end side of the inflator 110 in the longitudinal direction is inserted into the inflator attachment portion 116 up to the vicinity of the stud bolt 112a.

FIG. 3(b) is an exploded view of the vicinity of the inflator attachment portion 116 shown in FIG. 3(a). The inflator attachment portion 116 is configured to include a protruding piece 122 extending continuously from the base cloth of the chamber 114, and an extension portion 124 formed of a base cloth independent of the base cloth of the chamber 114. The extension portion 124 is inserted into the interior of the chamber 114 in the vicinity of the protruding piece (or section) 122 and attached to the chamber 114 by sewing or the like.

The extension portion 124 has a cylindrical shape as a whole and is configured to extend continuously from the chamber 114 in a tubular shape by being attached to the chamber 114 on the vehicle rear side. The extension portion 124 has an insertion port 126 into which the inflator 110 is to be inserted and outflow ports 128, 129 through which gas from the inflator 110 flows. Since the outflow ports 128 and 129 of the extension portion 124 face upward and downward, respectively, inside the chamber 114, the gas can flow upward and downward inside the chamber, thereby efficiently filling the chamber 114 with the gas.

The diameter of the extension portion 124 in the vicinity of the insertion port 126 may be large enough to insert the inflator 110. In the present embodiment, there is no need to provide an opening having a size equal to or larger than the diameter of the extension portion 124 in the cushion 104. Therefore, according to the present embodiment, it is possible to suppress the outflow amount of the gas from the cushion 104 during the operation of the inflator 110, and to improve the internal pressure holding performance of the cushion 104.

As illustrated in FIG. 2(b), a band 130 can also be fastened to the inflator attachment portion 116 including the extension portion 124. The band 130 is made of a metal or a resin, and fastens the extension portion 124 to the inflator 110 from above the inflator 110. By fastening the extension portion 124 with the band 130, it is possible to prevent the gas from flowing out from the insertion port 126 and efficiently hold the internal pressure of the cushion 104.

The tab 118 is formed of a base cloth independent of the base cloth of the chamber 114. A non-inflatable portion 132 which is a joining portion of the base cloth is formed on the outer periphery of the chamber 114, and the tab 118 is attached to the non-inflatable portion 132 in the vicinity of the extension portion 124 by sewing or the like. As a result, as shown in FIG. 3(a), the tab 118 extends from the non-inflatable portion 132.

The inflator 110 which is used in the present embodiment is of a cylinder type (cylinder-like inflator). The inflator 110 has gas ejection holes 134 near one end side in the longitudinal direction and a connector 136 on the other end side. As shown in FIG. 3(a), the inflator 110 is attached in a state in which one end thereof is inserted into the extension portion 124 and the other end is exposed to the outside.

The gas ejection holes 134 shown in FIG. 3(b) are configured as a set of a plurality of small holes and are disposed inside the cushion 104 to eject gas. The configuration in which the gas ejection holes 134 are provided at the longitudinal end portion of the inflator 110 is not limiting, and even when the gas ejection holes are provided on the center side of the inflator 110 in the longitudinal direction, gas can be advantageously supplied to the chamber 114 by disposing the gas ejection holes inside the cushion 104 through the inflator attachment portion 116. A predetermined harness (not shown) extending from the vehicle side can be connected to the connector 136 to allow the connector to receive a predetermined signal resulting from the detection of an impact through the harness in the case of emergency.

The following types of inflators are presently widely used: a type in which a gas generating agent is filled and burned to generate a gas, a type in which compressed gas is filled and a gas is supplied without generating heat, and a hybrid type using both combustion gas and compressed gas. An inflator of any type can be used as the inflator 110.

The stud bolts 112 are provided at predetermined positions on the side portion of the inflator 110. The stud bolt 112a on one end side of the inflator 110 passes through the extension portion 124 and the protruding piece 122, and is exposed. This stud bolt is fastened to a storage portion or the like inside the seatback 108 (see FIG. 1(b)).

Figure 4:
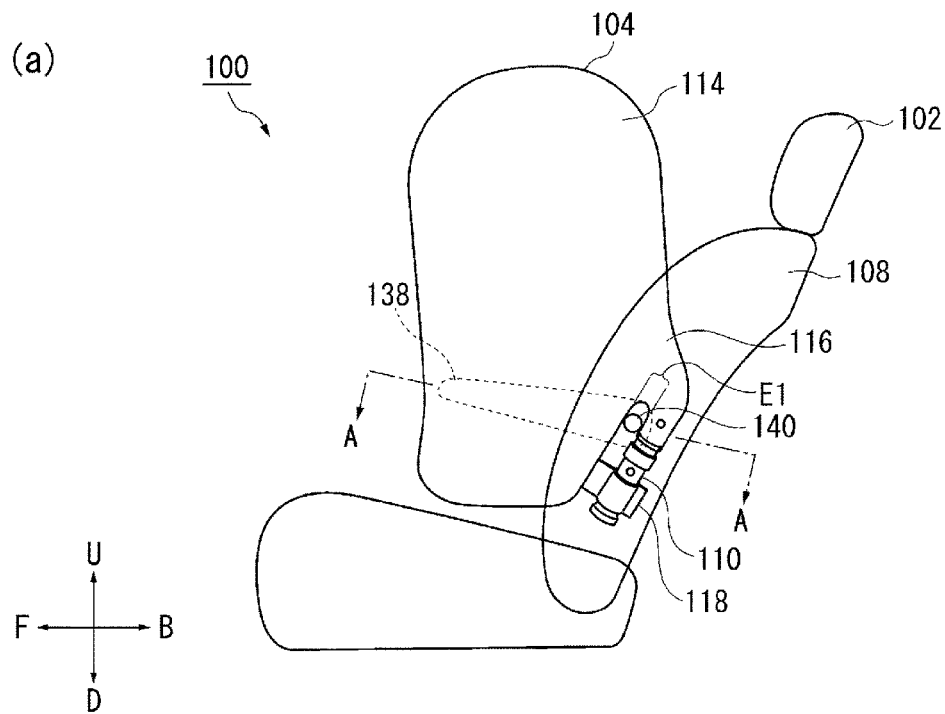
FIGS. 4(a) and 4(b) are views illustrating the side airbag device shown in FIG. 1(a) from another direction.
Figure 4:
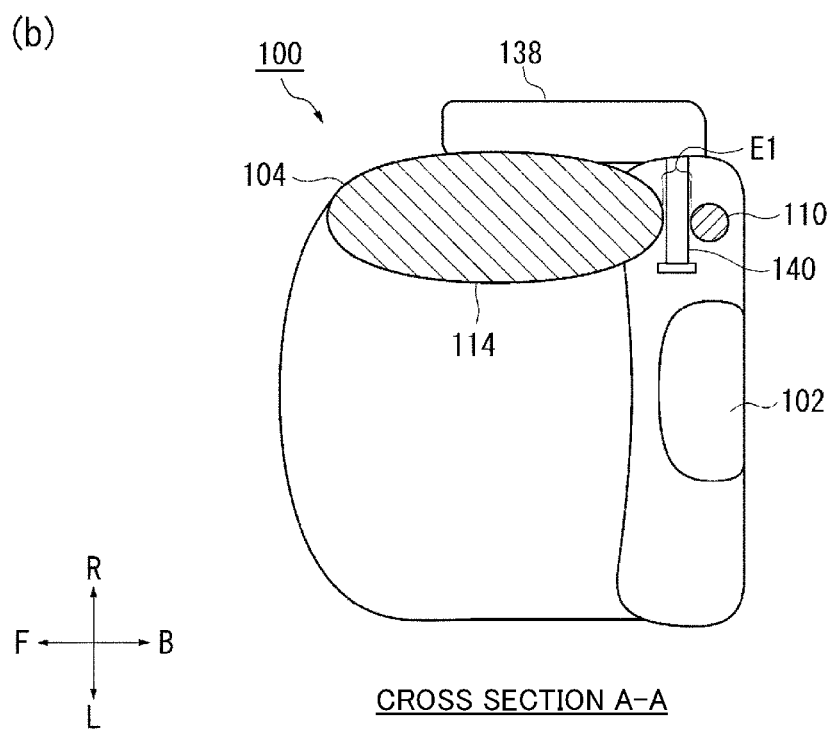

FIGS. 4(a) and 4(b) are diagrams illustrating the side airbag device 100 shown in FIG. 1(a) from another direction. FIG. 4(a) illustrates the side airbag device 100 as seen from the vehicle inner side.

In the present embodiment, a rotating shaft 140 of an armrest 138 exemplifies the structure built in the seatback 108. The rotating shaft 140 is disposed so as to pass through a space portion E1 surrounded by the chamber 114, the extension portion 124, the inflator 110, and the tab 118, and is fixed to the seatback 108.

FIG. 4(b) is a cross-sectional view taken along the line A-A of the side airbag device 100 shown in FIG. 4(a). The rotating shaft 140 extends in the vehicle width direction through the space portion E1. In this way, by avoiding the rotating shaft 140 by using the space portion E1, it is possible to incorporate the cushion 104 and the inflator 110 in the seatback 108 without problems.

Referring again to FIG. 4(a), in the present embodiment, the cushion 104 and the inflator 110 are attached to the seat mainly by using the stud bolts 112. However, since the rotating shaft 140 is passed through the space portion E1, the rotating shaft 140 is also used for attaching the inflator 110 and the like.

Since the rotating shaft 140 passes through the space portion E1, it is also possible to speed up the inflation and deployment of the cushion 104. For example, when the inflator 110 is in operation, the cushion 104 inflates and deploys from the seatback 108 toward the vehicle front side. At that time, since the rotating shaft 140 is present on the vehicle rear side of the cushion 104, the rotating shaft 140 interferes with the action of rotating the cushion 104 to the vehicle front side and the deploying behavior of the cushion 104 is regulated. In this manner, by supporting the cushion 104 on the rotating shaft 140, it is possible to prevent unexpected behavior of the cushion 104 and to inflate and deploy the cushion 104 rapidly toward the target range.

In the present embodiment, since the rotating shaft 140 can be avoided in the space portion E1 and the posture of the cushion 104 can be supported by using the rotating shaft 140, a layout relating to the arrangement of the inflator 110 with respect to the cushion 104 can be selected more freely.

In the conventional side airbag device, the cushion 104 is often attached to the seat by using only the stud bolt 112 of the inflator 110. A corresponding load is applied particularly to the chamber 114 of the cushion 104 when the occupant is restrained. Therefore, the degree of freedom of the layout of the inflator 110 is restricted because it is necessary to dispose the inflator 110 at a place where the inflator can be supported without collapsing the chamber 114, for example, the entire inflator 110 is placed into the chamber 114 and the stud bolt 112 is passed through the chamber 114 and fastened to the seat.

In the present embodiment, although the inflator 110 is configured to be inserted into the extension portion 124 extending from the chamber 114, since the tab 118 connects the inflator 110 and the chamber 114 to each other, the posture of the chamber 114 can be efficiently supported by the inflator 110. Further, since there is the space portion E1, even when a structure such as the rotating shaft 140 of the armrest 138 is present inside the seat 102, the structure can be avoided. Thus, in the present embodiment, maintenance of the posture of the chamber 114 and avoidance of the structure are achieved. Therefore, it is possible to arrange the inflator 110 more freely with respect to the chamber 114, and versatility is improved, for example, the layout of the inflator 110 can be changed according to the type of the seat.

In the present embodiment, the extension portion 124 is provided slightly below the center of the chamber 114 in the vehicle vertical direction. However, the position for providing the extension portion 124 is not limited thereto and can be appropriately changed according to the internal structure of the seatback 108, for example, to the vehicle upper side or vehicle lower side.

As shown in FIG. 1(a), in the present embodiment, since the cushion 104 is inflated and deployed on the occupant side (vehicle inner side) in the vehicle width direction with respect to the armrest 138, the cushion 104 can be supported by the armrest 138. For example, because of the presence of the armrest 138 on the vehicle outer side of the cushion 104, the load of the occupant in contact with the cushion 104 from the vehicle inner side can be absorbed by the armrest 138 thereby increasing the occupant restraining force of the cushion 104.

In the present embodiment, the armrest 138, the cushion 104 and the inflator 110 are provided on the side portion of the seatback 108 on the vehicle outer side. However, the armrest 138, the cushion 104, and the like can be advantageously provided also on the side portion of the seatback 108 on the vehicle inner side. On the vehicle inner side of the seat 102, unlike the vehicle outer side, there are often no structures such as side doors. However, by providing the armrest 138, the cushion 104, and the like of the present embodiment also on the inner side of the seat 102, it is possible to obtain the effect of suppressing the movement of the cushion 104 in the vehicle width direction by using the armrest 138 also on the vehicle inner side. As a result, a high occupant restraining property can be exhibited also on the vehicle inner side. The side airbag device 100 of the present embodiment as described above can be implemented on one side portion of the seat 102 in the vehicle width direction or on both side portions of the seat 102 in the vehicle width direction.

Figure 5:
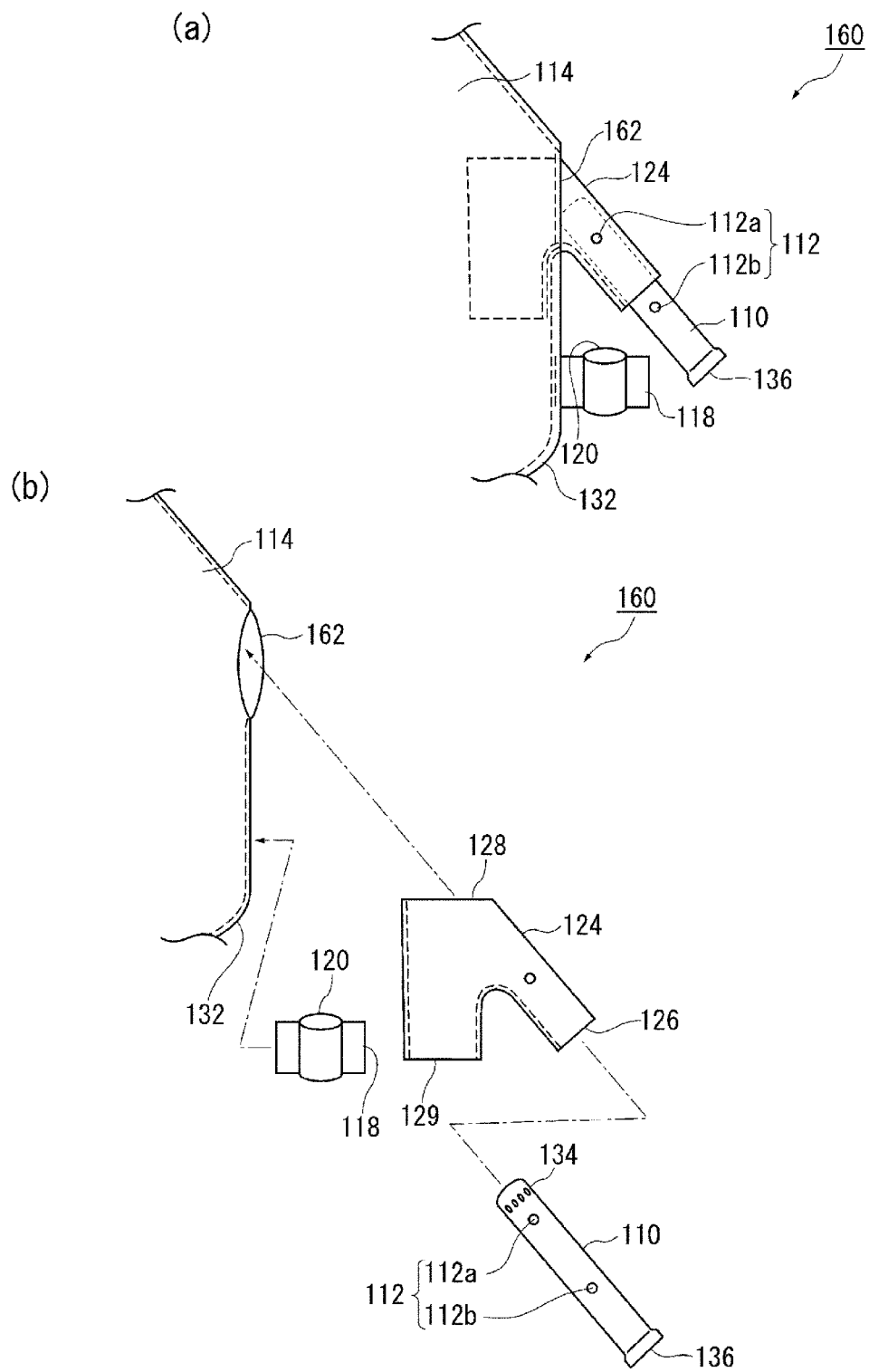
FIGS. 5(a) and 5(b) are views exemplifying a first modification of the cushion shown in FIGS. 3(a) and 3(b).

FIGS. 5(a) and 5(b) are diagrams exemplifying a first modification of the cushion 104 shown in FIGS. 3(a) and 3(b). In the following description, the already described components are assigned with the same reference numerals, and the description thereof is omitted. Even in the case of components assigned with different reference numerals, those having the same names as the already described components are assumed to have the same configuration and function.

In the configuration of a cushion 160 of FIG. 5(a), by contrast with the inflator attachment portion 116 shown in FIG. 3(a), the protruding piece 122 of the chamber 114 is eliminated, and the extension portion 124 is exposed from the chamber 114. As shown in FIG. 5(b), a predetermined opening 162 is provided in the chamber 114. The extension portion 124 can also be attached by sewing (see FIG. 5(a)) or the like to the edge of the opening 162. With this configuration, it is also possible to exert advantageously the functions of the extension portion 124.

Figure 6:
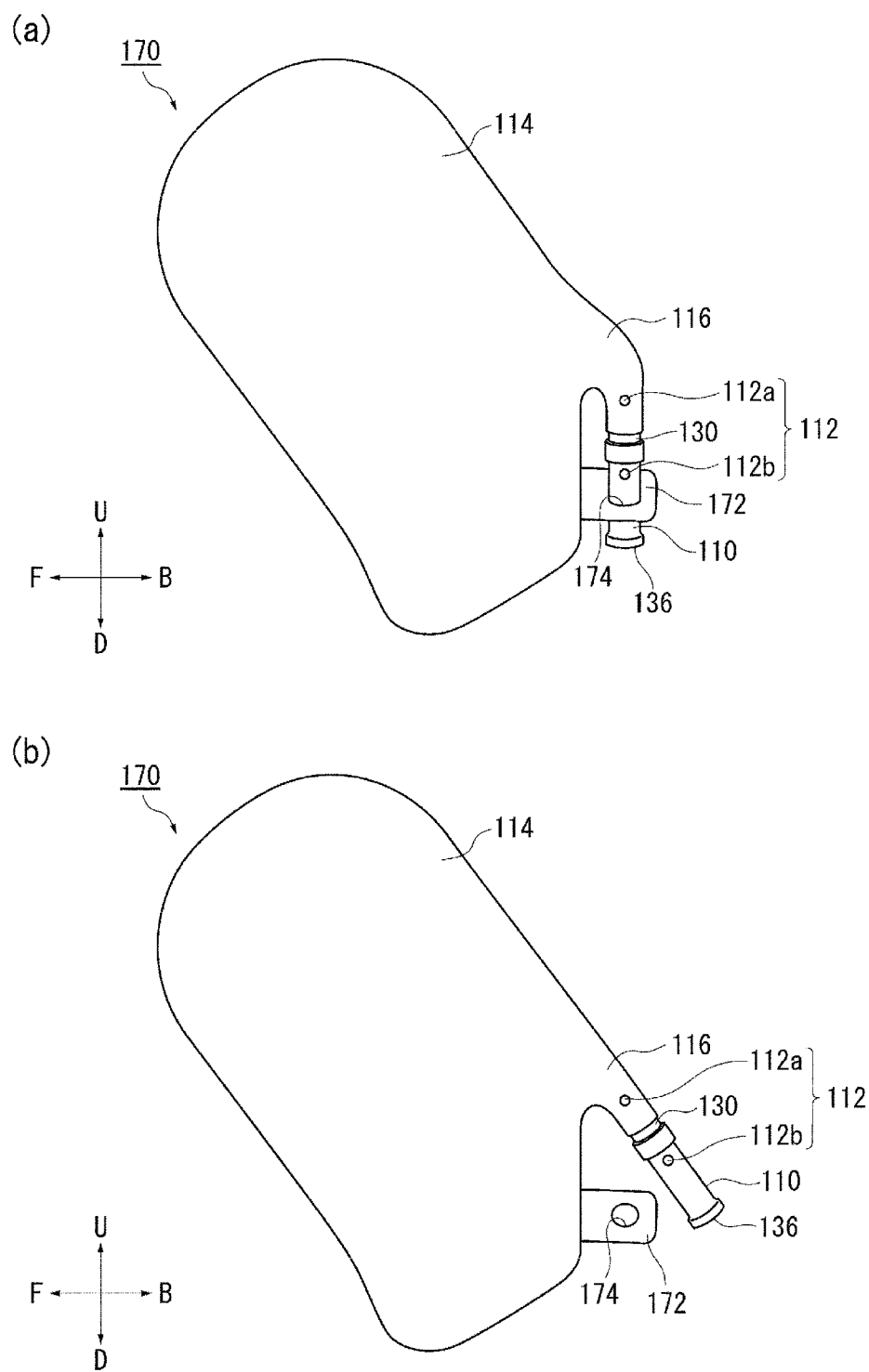
FIGS. 6(a) and 6(b) are views exemplifying a second modification of the cushion shown in FIGS. 2(a) and 2(b).

FIGS. 6(a) and 6(b) are diagrams exemplifying a second modification of the cushion 104 shown in FIGS. 2(a) and 2(b). A cushion 170 shown in FIG. 6(a) differs from the cushion 104 shown in FIG. 2(a) in the structure of the tab 172.

The tab 172 has a through hole 174 for holding the vicinity of the other end side of the inflator 110. FIG. 6(b) is a view in which the inflator 110 is removed from the tab 172 shown in FIG. 6(a). Even with the tab 172 having a simple configuration provided with the through hole 174, the tab can be caught on the inflator 110, with the inflator 110 being passed therethrough, and held advantageously on the inflator 110.

Figure 7:
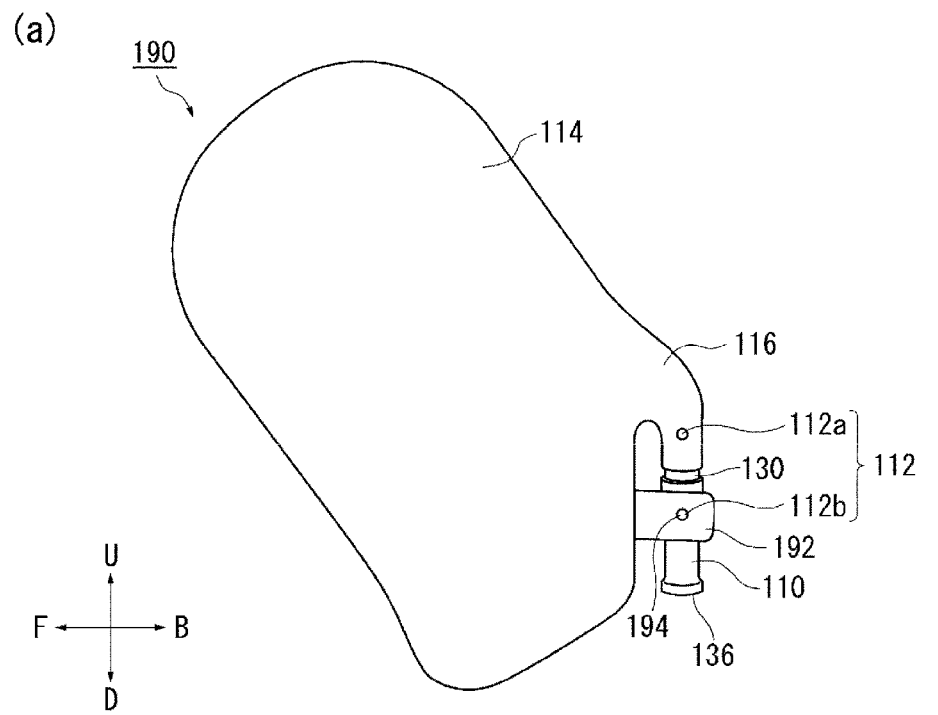
FIGS. 7(a) and 7(b) are views exemplifying a third modification example of the cushion shown in FIGS. 2(a) and 2(b).
Figure 7:
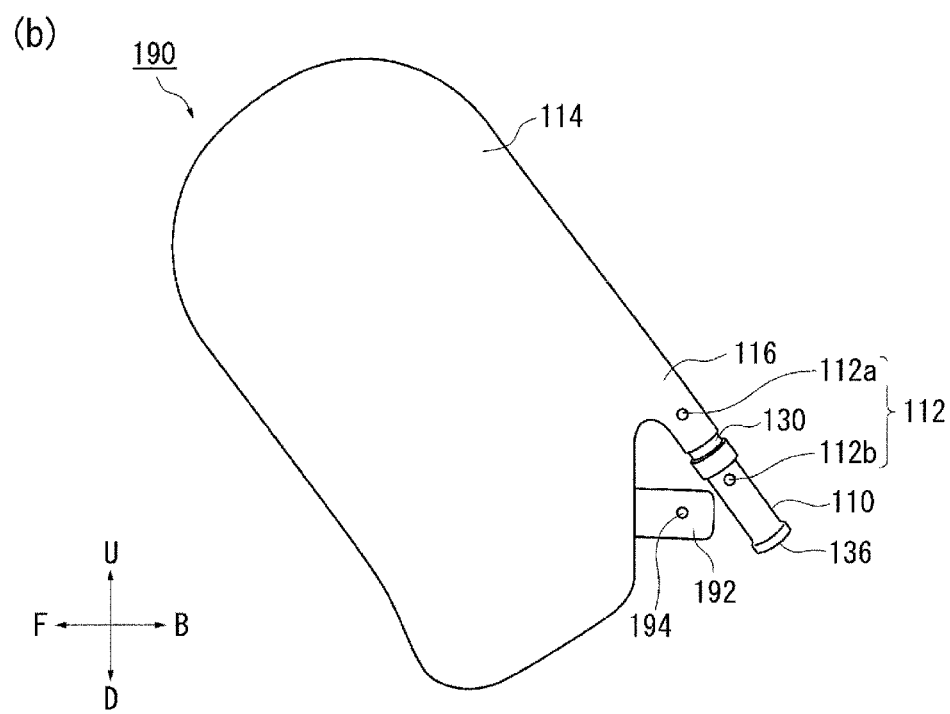

FIGS. 7(a) and 7(b) are diagrams exemplifying a third modification of the cushion 104 shown in FIGS. 2(a) and 2(b). The cushion 190 shown in FIG. 7(a) also differs from the cushion 104 shown in FIG. 2(a) in the structure of the tab 192.

The tab 192 has a bolt hole 194 through which passes a stud bolt 112b provided on the other end side of the inflator 110 in the longitudinal direction. FIG. 7(b) is a view in which the stud bolt 112b is removed from the tab 192 shown in FIG. 7(a). Even with the tab 192 having a simple configuration provided with the bolt hole 194, the tab can be caught on the inflator 110 via the stud bolt 112b and held advantageously on the inflator 110.

Although the preferred embodiments of the present invention have been described above with reference to the accompanying drawings, the above-described embodiments are preferred examples of the present invention, and other embodiments can also be implemented or accomplished by various methods. Unless otherwise specified in the description of the present application, the present invention is not limited by the detailed shape, size, mutual arrangement, etc. of the parts shown in the accompanying drawings. Also, the expressions and terms used in the description of the present application are for the purpose of explanation, and are not limiting.

While the above description constitutes the preferred embodiment of the present invention, it will be appreciated that the invention is susceptible to modification, variation and change without departing from the proper scope and fair meaning of the accompanying claims.

The invention claimed is:

1. A side airbag device for providing restraint of an occupant of a vehicle in a seat, comprising:
   an airbag cushion which is built in the seat of the vehicle and inflates and deploys using a gas toward a side of the occupant sitting in the seat and toward a vehicle front side;

an inflator for providing the gas having a cylindrical shape and having a first end inserted into the airbag cushion to supply the gas to the airbag cushion and a second end; and a structure which is built in the seat, which extends in a vehicle width direction and is fixed to the seat, wherein at least one gas ejection hole adjacent the first end which is disposed inside the airbag cushion to eject the gas;

a connector which is provided on the second end and to which a harness is connected; and a stud bolt which is provided at a predetermined location on the inflator and is fastened to the seat, the airbag cushion has:

a chamber formed in a bag shape;

an extension portion which extends from the chamber on a vehicle rear side and into which the first end of the inflator is inserted; and a tab which extends from the chamber in the vicinity of the extension portion and is held in the vicinity of the second end of the inflator, and the structure is disposed so as to pass through a space portion surrounded by the chamber, the extension portion, the inflator, and the tab, and the airbag cushion is attached to the seat by the stud bolt.

2. The side airbag device according to claim 1, further comprising, the airbag cushion further includes a non-inflatable portion that is a joining portion of a base cloth of the chamber; and the tab extends from the non-inflatable portion.

3. The side airbag device according to claim 1, further comprising, the tab is formed of a first base cloth independent of a second base cloth of the chamber and is attached to the chamber.

4. The side airbag device according to claim 1, further comprising, the tab has a loop that is hooked in the vicinity of the second end of the inflator.

5. The side airbag device according to claim 1, further comprising, the tab has a through hole to be hooked in the vicinity of the second end of the inflator.

6. The side airbag device according to claim 1, further comprising, the tab has a bolt hole through which the stud bolt passes.

7. The side airbag according to claim 1, further comprising, the extension portion is formed of a first base cloth independent of a second base cloth of the chamber and is attached to the chamber by sewing.

8. The side airbag device according to claim 1, wherein the side airbag device further comprises a band for fastening the extension portion to the inflator.

9. The side airbag device according to claim 1, further comprising, the structure is a rotation shaft of an armrest of the seat.

10. The side airbag device according to claim 9, further comprising, the airbag cushion inflates and deploys on the occupant side in the vehicle width direction with respect to the armrest.

* * * * *